INVENTORS
ALBERT J. BOETTLER
ALLAN M. CLARKE
ROGER W. WHEATLEY

ATTORNEY

United States Patent Office 3,749,648
Patented July 31, 1973

3,749,648
RECOVERY OF SPENT SULFURIC ACID FROM CHLORINATED AND NITRATED BENZOIC ACID DERIVATIVES
Albert J. Boettler, Dyer, Allan M. Clarke, Griffith, and Roger W. Wheatley, Portage, Ind., assignors to E. I. du Pont de Nemours and Company, Wilmington, Del.
Filed May 19, 1971, Ser. No. 144,830
Int. Cl. B01d 15/00, 3/38
U.S. Cl. 203—41                    5 Claims

ABSTRACT OF THE DISCLOSURE

A waste sulfuric acid-water solution containing small amounts of nitric acid, nitrous acid, hydrofluoric acid and chlorinated and nitrated organics of the benzoic and benzotrifluoride type can be reconstituted by a recovery process. In one embodiment the first step will be solvent extraction to remove the organics from the waste acid. The second step will involve steam stripping of the waste acid to remove the nitric acid, nitrous acid, hydrofluoric acid, and the small quantity of solvent which was dissolved in the acid in the first step. After these process steps, the reconstituted acid will be suitable for normal industrial use.

In another embodiment, the waste acid is first steam distilled to remove the nitric acid, nitrous acid, hydrofluoric acid and the chlorinated and nitrated benzotrifluoride compounds. The still bottoms are then cooled and filtered to remove the benzoic acid compounds. The filtrate is the desired reconstituted acid.

BACKGROUND OF THE INVENTION

The compound trifluralin, $\alpha,\alpha,\alpha$-trifluoro-2,6-dinitro-N,N-dipropyl-p-toluidine:

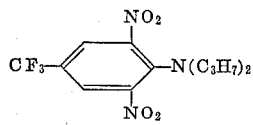

is a commercial herbicide. This compound is prepared in a multi-step process in which one step is a nitration using a mixture of nitric and sulfuric acid. The spent sulfuric acid produced in the process can be recovered; however, in view of the inorganic and organic impurities it contains, it is not commercially useful. These impurities include original reactants, the products of the desired reaction and also those of undesired side reactions.

SUMMARY OF THE INVENTION

We have discovered that the spent sulfuric acid produced during the production of trifluralin can be processed to recover useable sulfuric acid and other valuable organic compounds. The process of the invention can be conducted in either of two embodiments.

In one embodiment the spent acid containing nitric acid, nitrous acid, inorganic fluorides, p-chlorobenzotrifluoride and its nitro analogs and p-chlorobenzoic acid and its nitro analogs is subject to solvent extraction to remove p-chlorobenzotrifluoride and p-chlorobenzoic acid and their nitro analogs. The solvent extract can then be distilled to recover the solvent and the p-chlorobenzotrifluoride and p-chlorobenzoic acid compounds.

The raffinate from the first step is then steam distilled to separate overhead the nitric acid, nitrous acid, inorganic fluorides and any solvent present, the distillation bottoms is a sulfuric acid of commercial quality.

In the other embodiment, the spent acid is first steam distilled to remove the nitric acid, nitrous acid, inorganic fluorides, and the volatile p-chlorobenzotrifluoride and its nitro analogs. The volatile p-chlorobenzotrifluoride compounds can be recovered from the distillation overhead by condensation and separation of the heavier liquid phase.

The p-chlorobenzoic acid and its nitro analogs remaining in the distilled acid can be separated by any of the following procedures:

(a) cooling the acid to effect precipitation and filtering;
(b) step (a) above followed by adsorption using activated carbon or adsorbent polymeric resin; or
(c) solvent extraction.

DETAILED DESCRIPTION OF THE INVENTION

The spent acid recovered from trifluralin manufacture has approximately the following composition, the percentages and parts being by weight:

|  | Normal | Range |
|---|---|---|
| Sulfuric acid, percent | 87 | 86–93 |
| Nitrous acid, percent | 4 | 0–5.0 |
| Nitric acid, percent | 0.02 | 0–1.5 |
| Inorganic fluorides as F (p.p.m.) | 750 | 0–3000 |
| Organics: | | |
| p-Chlorobenzotrifluoride and its nitro analogs, percent | 1.0 | [1] 0–3 |
| p-Chlorobenzoic acid and its nitro analogs, percent | 1.0 | [1] 0–3 |
| Water | Balance | Balance |

[1] The total maximum of the two organic compounds is about 3.0%.

The following organics are present in the spent acid as the result of the desired reaction to make trifluralin:

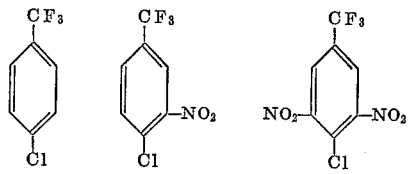

For convenience these compounds will be labeled p-chlorobenzotrifluoride and its nitro analogs.

During the reaction, the following undesired side reaction can take place:

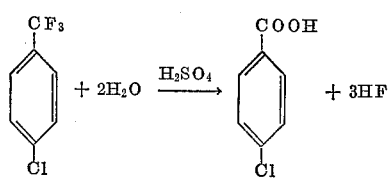

Thus the following organics are also present in the spent acid:

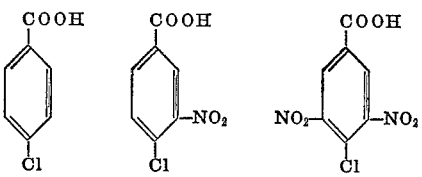

For convenience these compounds will be labeled p-chlorobenzoic acid and its nitro analogs.

The inorganic fluorides present in the spent acid are believed to be present mainly as hydrofluoric acid.

Figure 1:
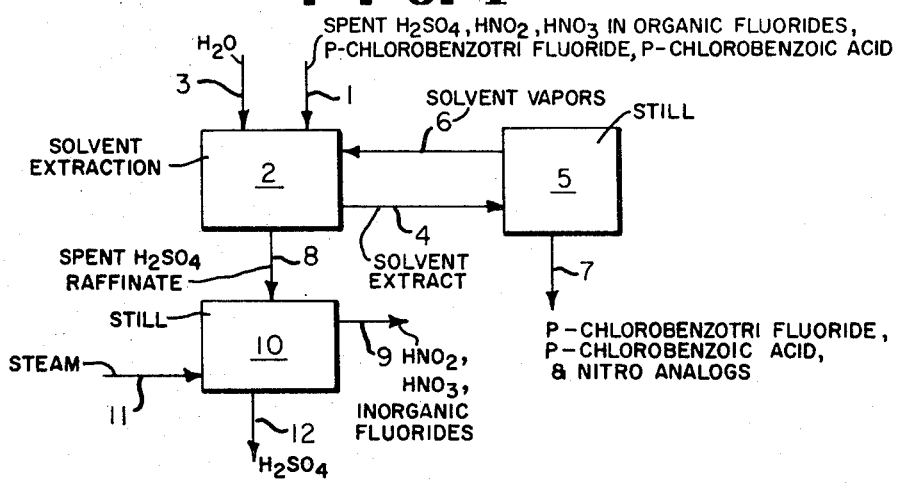
FIG. 1 is a flow chart of the first embodiment of the process of the invention.

In the first embodiment, illustrated in FIG. 1, the spent acid 1 is solvent extracted 2 to remove the p-chlorobenzotrifluoride and its nitro analogs and the p-chlorobenzoic acid and its nitro analogs. However, prior to the solvent extraction, it is often beneficial to add water 3 to the spent acid to lower the concentration of sulfuric acid to 70–80% by weight or lower. The increase in water concentration improves the efficiency of the solvent by increasing the distribution coefficient. However, this water dilution is not absolutely essential and the solvent extraction can operate at concentrations of 90% sulfuric acid.

A variety of solvents could be used in the extraction step, the basic requirements being that the solvent is inert, and exhibits a high distribution coefficient relative to the sulfuric acid. Useful solvents include 1,2-trichloroethane, chloroform, 1,1,1-trichloroethane, trichloroethylene, and carbon tetrachloride. Particularly preferred solvents because of their high distribution coefficients relative to the acid and thus very efficient are chlorinated solvents such as ethylene dichloride or methylene chloride.

The solvent extraction can be conducted batchwise or continuously in conventional equipment. The temperature of this step is not critical and can vary from room temperature to the boiling point of the solvent used. The contact time of the extraction also is not critical and is related to the number of stages involved, i.e., with less stages longer contact time will be required. In a typical embodiment the solvent extraction unit would have three theoretical stages.

As illustrated in FIG. 1, the solvent extract 4 can be fed into a still 5 to recover purified solvent 6 overhead for recycle. The operating conditions for this still will depend upon the solvent used. Thus the still will usually be operated at the boiling point of the solvent at atmospheric pressure; however, the still can be operated under vacuum if desired with some solvents.

The still bottoms 7 will contain the p-chlorobenzotrifluoride and p-chlorobenzoic acid and their nitro analogs and some solvent. The bottoms can be cooled, conveniently to room temperature, i.e., 20 to 30° C. and since the p-chlorobenzoic acid compounds have a low solubility in the p-chlorobenzotrifluoride compounds, they will precipitate and can be separated by any liquid/solid separating means. These compounds can be recovered for use. It is preferred to add water to the still bottoms to aid in the separation and recovery of the organic compounds.

In the second step of this prefered embodiment, the spent acid raffinate 8 is steam distilled 10 to remove overhead 9 the nitric acid, nitrous acid, hydrogen fluoride, and any solvent that was dissolved in the first step.

The steam distillation of the spent acid raffinate is performed in a stripping column with countercurrent flow of the raffinate 8 and the steam 11. The ratio of acid raffinate to steam is not critical and a prefererd ratio would be about 5:1. The sulfuric acid concentration in the raffinate must be maintained below 72% by weight to effect complete nitric and nitrous acid removal. At higher concentrations, these acids complex with the sulfuric acid to form stable nitrosyl-sulfuric acid which resist stripping. This concentration can be obtained by water or steam addition.

The distillation can take place continuously or batchwise in conventional steam distillation equipment. The temperature of distillation will generally be at the boiling point of the acid, thus it will range from 160–180° C. The distillation can be conducted at atmospheric pressure or under vacuum, whichever is desired. Particularly useful operating conditions for corrosion reasons are distilling at 170° C. at atmospheric pressure.

The distillation bottom 12 is the hot recovered sulfuric acid. The recovered acid is cooled in a conventional heat exchanger and is suitable for sale. Under proper operating conditions, the composition of the recovered acid will be about the following:

|  |  | Range |
|---|---|---|
| $H_2SO_4$ | percent | 65–75 |
| $HNO_2$ | do | <.01 |
| $HNO_3$ | do | <.01 |
| Fluorine | p.p.m. | <10 |
| Nitro analogs of p-chlorobenzotrifluoride | percent | <0.05 |
| Nitro analogs of benzoic acid | do | <0.05 |
| Water |  | Balance |

Thus the spent acid has been upgraded to a saleable quality of sulfuric acid.

The nitrogen oxides in the aqueous condensate stream from the distillation step 9, and if desired the organics 5 from the first step can, instead of being recovered, be fed to a combustion furnace, water scrubbed and neutralized (not illustrated).

Figure 2:
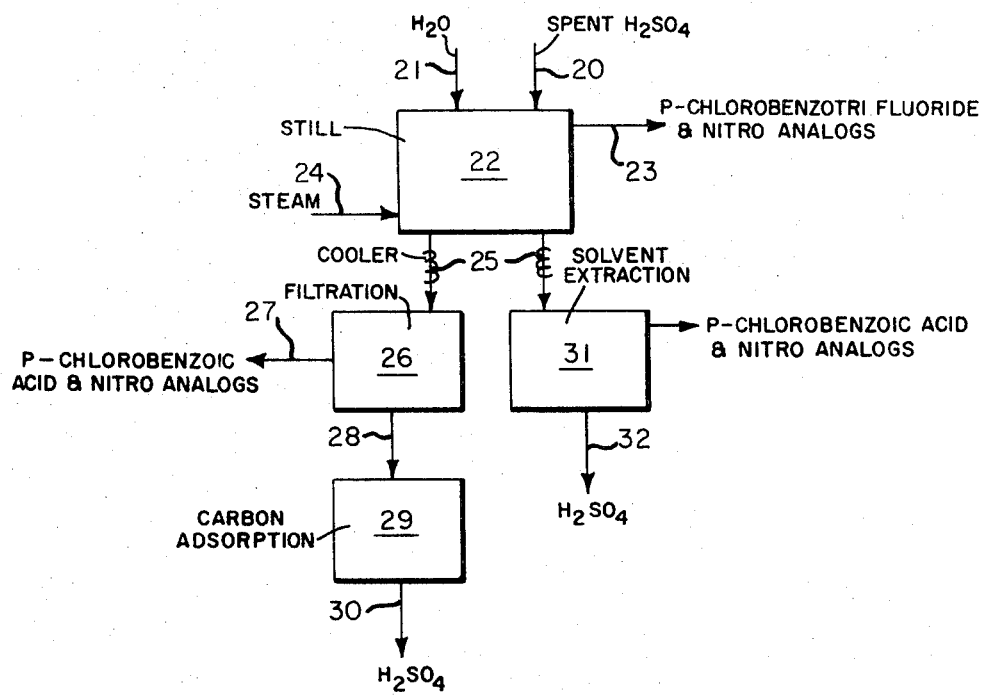
FIG. 2 is a flow chart of the second embodiment of the process.

In the alternate embodiment, illustrated in FIG. 2, the spent acid 20 is first diluted with either water, steam, or both 21, so that the sulfuric acid concentration is maintained below 72% by weight. At higher concentrations, the nitric and nitrous acids present cannot be completely removed by steam distillation, i.e., they will form nitrosylsulfuric acid which resists stripping.

The diluted spent acid is then steam distilled 22 to remove overhead the nitric acid, nitrous acid, hydrogen fluoride and the volatile p-chlorobenzotrifluoride and its nitro analogs 23

The steam distillation is performed in a conventional stripping column with countercurrent flow of acid 20 and steam 24. The distillation can take place continuously or batchwise in conventional steam distillation equipment. The temperature of distillation will generally be at the boiling point of the acid, thus it will range from 160–180° C. The distillation can be conducted at atmospheric pressure or under vacuum, whichever is desired. Particularly useful operating conditions for corrosion reasons are distilling at 170° C. at atmospheric pressure.

The p-chlorobenzotrifluoride and its nitro analogs can be recovered from the still overhead 23 by condensation and separation of the liquid phases (not illustrated). The desired analogs will be present in the heavier oil layer. The yield of p-chlorobenzotrifluoride, and its nitro analogs, based on its composition in the original spent acid, will be less than 100% due to partial hydrolysis to hydrogen fluoride and p-chlorobenzoic acid compounds in the hot sulfuric acid.

At the still operating temperature, p-chlorobenzoic acid and its nitro analogs remain in the distilled acid because of its low vapor pressure. These benzoic acid compounds can be removed by three different methods.

The still bottoms 25 can be cooled to temperatures in the range of ambient to 100° C. This cooling affects precipitation of the p-chlorobenzoic acid compounds and they can be removed from the acid by filtration or any other convenient liquid solid separation means 26, e.g., filtration. At ambient temperatures this method will reduce the benzoic acid compound content of the recovered acid 27 to less than 0.5%.

If desired, the filtered acid 28 can be further treated by adsorption 29 using activated carbon or adsorbent polymeric resin. A useful polymeric resin is Rohm & Haas's "Amberlite" X-AD₄ which is a polystyrene type polymer crosslinked with divinylbenzene. This method can reduce the p-chlorobenzoic acid content of the acid 30 to less than 0.05%. It is possible to use the resin itself as the liquid/solid separation means; however, this approach is not preferred.

The p-chlorobenzoic acid compounds can also be removed from the still bottoms 25 by solvent extraction 31. This step will be operated using the same solvents as in the first step of the preferred process, and under similar conditions, and will result in the desired acid product 32 containing less than 0.05% of the p-chlorobenzoic acid and its nitro analogs.

In each of these methods, the p-chlorobenzoic acid compound can be recovered. If solvent extraction is used, the method previously set forth can be used. When the polymeric resin is used, the benzoic acid compounds can be recovered by regeneration of the resin, e.g., using methanol. However since conventional regeneration of the activated carbon would decompose the p-chlorobenzoic acid compounds, their recovery when activated carbon is used is not very practicable.

The following is an exemplary operation of the first embodiment of the process of the invention.

One ton of spent acid and .25 ton of water are fed to a solvent extractor. The solvent used is ethylene dichloride and the unit is at 50° C.

The solvent extract is fed to a still which operates at 75° C. at atmospheric pressure. The overhead from this still is ethylene dichloride which is recycled to the solvent extractor. The still bottoms are further treated to recover 20 pounds of p-chlorobenzotrifluoride and its nitro analogs.

The spent acid raffinate is steam distilled at 170° C. at atmospheric pressure, the ratio of acid to steam being 5:1. The still bottoms are cooled, producing 1.25 tons of reprocessed acid of the following composition:

| | | |
|---|---|---|
| $H_2SO_4$ | percent | 70 |
| $HNO_3$ | do | <.01 |
| $HNO_2$ | do | <.01 |
| Flourine | p.p.m | <10 |
| p-Chlorobenzotrifluoride and its nitro analogs | percent | <0.05 |
| p-Chlorobenzoic acid and its nitro analogs | do | <0.05 |
| Water | | Balance |

We claim:

1. A process for the recovery of useful sulfuric acid from spent sulfuric acid, said spent sulfuric acid containing 86–93% by weight sulfuric acid and the balance being nitrous acid, nitric acid, inorganic fluorides, p-chlorobenzotrifluoride and its nitro analogs, p-chlorobenzoic acid and its nitro analogs and water, characterized in that the spent acid is solvent extracted with an inert solvent which exhibits a high distribution coefficient relative to sulfuric acid to produce a raffinate essentially free from said p-chlorobenzotrifluoride and its nitro analogs and p-chlorobenzoic acid and its nitro analogs, the raffinate is diluted with water or steam to below 72% by weight sulfuric acid and steam distilled wherein the nitric acid, nitrous acid, inorganic fluorides and any of said solvent present are removed overhead, the distillation bottoms being sulfuric acid of useable quality.

2. The process of claim 1 wherein the solvent extract is distilled to recover the solvent overhead and the distillation bottoms are cooled whereby the p-chlorobenzoic acid and its nitro analogs precipitate and can be separated from the p-chlorobenzotrifluoride and its nitro analogs.

3. The process of claim 1 wherein the concentration of the sulfuric acid in the spent acid is reduced with water to 70 to 80% by weight prior to the solvent extraction.

4. A process for the recovery of useful sulfuric acid from spent sulfuric acid, said spent sulfuric acid containing 86–93% by weight sulfuric acid, and the balance being nitrous acid, nitric acid, inorganic fluorides, p-chlorobenzotrifluoride and its nitro analogs, p-chlorobenzoic acid and its nitro analogs and water, characterized in that the concentration of the sulfuric acid in the spent acid is reduced to below 72% by weight with water or steam and the diluted acid is steam distilled wherein the nitric acid, nitrous acid, inorganic fluorides, and p-chlorobenzotrifluoride and its nitro analogs are removed overhead, the distillation bottom is then treated to remove the p-chlorobenzoic acid and its nitro analogs from the sulfuric acid by (i) cooling said bottoms to precipitate said p-chlorobenzoic acid compounds and then separating them from the sulfuric acid using a liquid/solid separation means; or (ii) cooling said bottoms to precipitate said p-chlorobenzoic acid compounds, separating said compounds from the sulfuric acid using a liquid/solid separation means and then adsorbing the remaining p-chlorobenzoic acid compound in activated carbon or an adsorbent polymeric resin; or (iii) said bottoms are solvent extracted with an inert solvent which exhibits a high distribution coefficient relative to sulfuric acid to remove said p-chlorobenzoic acid compounds;

the remaining sulfuric acid being of useable quality.

5. A process for the recovery of useful sulfuric acid from spent sulfuric acid, said spent sulfuric acid containing 86–93% by weight sulfuric acid, and the balance being nitrous acid, nitric acid, inorganic fluorides, p-chlorobenzotrifluoride and its nitro analogs, p-chlorobenzoic acid and its nitro analogs and water, characterized in that the concentration of the sulfuric acid in the spend acid is reduced to below 72% by weight with water or steam and the diluted acid is steam distilled wherein the nitric acid, nitrous acid, inorganic fluorides, and p-chlorobenzotrifluoride and its nitro analogs are removed overhead, the distillation bottom is then treated to remove the p-chlorobenzoic acid and its nitro analogs from the sulfuric acid by cooling said bottoms to precipitate said p-chlorobenzoic acid compounds and then separating them from the sulfuric acid using a liquid/solid separation means, the remaining sulfuric acid being of useable quality.

References Cited

UNITED STATES PATENTS

| | | | |
|---|---|---|---|
| 3,186,809 | 6/1965 | Kreevoy et al. | 23—312 R |
| 1,904,200 | 4/1933 | Brooks | 203—96 |

FOREIGN PATENTS 917,253  1/1963  Great Britain.

NORMAN YUDKOFF, Primary Examiner

D. EDWARDS, Assistant Examiner

U.S. Cl. X.R.

260—515 A, 577; 423—531; 203—43, 48, 96